United States Patent
Linyard et al.

(10) Patent No.: US 7,831,688 B2
(45) Date of Patent: Nov. 9, 2010

(54) METHOD AND SYSTEM FOR PROVIDING ELECTRONIC USER ASSISTANCE

(75) Inventors: Ronald A. Linyard, San Diego, CA (US); Arlyn Asch, San Diego, CA (US); Jonas Salling, San Diego, CA (US); Brian C. Sparks, Santee, CA (US); Arie Trouw, Encinitas, CA (US); Mark Wineman, San Diego, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1212 days.

(21) Appl. No.: 09/876,788

(22) Filed: Jun. 6, 2001

(65) Prior Publication Data

US 2002/0023144 A1 Feb. 21, 2002

Related U.S. Application Data

(60) Provisional application No. 60/209,946, filed on Jun. 6, 2000, provisional application No. 60/209,841, filed on Jun. 7, 2000, provisional application No. 60/215,896, filed on Jul. 5, 2000.

(51) Int. Cl.
*G06F 15/16* (2006.01)
*G06F 17/30* (2006.01)

(52) U.S. Cl. .................. 709/218; 707/3; 707/5

(58) Field of Classification Search ........ 707/2, 707/3, 4, 5; 379/88.13; 709/218
See application file for complete search history.

(56) References Cited

U.S. PATENT DOCUMENTS 5,890,139 A * 3/1999 Suzuki et al. ............. 705/27
6,243,090 B1 * 6/2001 Machiraju et al. ......... 715/709
6,539,377 B1 * 3/2003 Culliss ...................... 707/5
6,584,464 B1 * 6/2003 Warthen .................... 707/4
6,665,655 B1 * 12/2003 Warner et al. ............. 707/2
6,675,159 B1 * 1/2004 Lin et al. ................... 707/3
6,768,790 B1 * 7/2004 Manduley et al. ...... 379/88.13

OTHER PUBLICATIONS

Ackerman, M.S., Malone, T.W., Answer Garden: A Tool for Growing Organizational Memory, 1990, ACM Press, pp. 31-39.*
Ackerman, M.S., McDonald, D.W., Answer Garder 2: merging organizational memory with collaborative help, 1996, ACM Press, pp. 97-105.*

* cited by examiner

*Primary Examiner*—Philip C Lee
(74) *Attorney, Agent, or Firm*—Robert C Kowert; Meyertons, Hood, Kivlin, Kowert & Goetzel, P.C.

(57) ABSTRACT

A system and method for incorporating software modules into a website or other information source that is searchable and updateable, which helps to create a dynamic user assistance environment. The system searches based on context/category sensitive natural language requests. This dynamic environment becomes "smarter" over time and will track questions and answers by a number of methods to assure the answers are up to date and that there is a high confidence match for the user's inquiry. The entire collection of data resides in a centralized location where the information can be leveraged to answer a user's question and aid in the creation of question/answer pairs for later use. Additionally, the assistance system supports a method for incorporating new informational content and answers to unanswered questions, for example by authorized support persons, that are categorized and stored in the existing system for later reference and use.

14 Claims, 14 Drawing Sheets

METHOD AND SYSTEM FOR PROVIDING ELECTRONIC USER ASSISTANCE

RELATED APPLICATIONS

This application claims priority to U.S. Provisional Application No. 60/209,946, filed Jun. 6, 2000 and titled "METHOD AND SYSTEM FOR HEURISTIC ELECTRONIC HELP," U.S. Provisional Patent Application No. 60/209,841, filed Jun. 7, 2000 and titled "METHOD AND SYSTEM FOR AUTOMATIC AGGREGATION OF WEBSITE CONTENT," and U.S. Provisional Patent Application No. 60/215,896, filed Jul. 5, 2000 and titled "METHOD AND SYSTEM FOR CONTENT-BASED ELECTRONIC HELP," which are all hereby incorporated by reference. This application further claims priority to U.S. application Ser. No. 09/805,417, filed Mar. 13, 2001 and titled "METHOD AND SYSTEM FOR WEBSITE MAINTENANCE," which 15 is hereby incorporated by reference.

BACKGROUND OF THE INVENTION

1. Field of the Invention

The invention relates to providing electronic user assistance. In particular, the invention relates to providing assistance to user requests for help through the use of a plurality of electronic capabilities, including, but not limited to, displaying files on a website, e-mail, or chat features.

2. Description of the Related Technology

The use of the Internet and the World Wide Web has increased dramatically in recent years. As a consequence, websites have generally incorporated multitudes of features to accommodate the demands of their users. Associated with the increase in functionality is added complexity for the user. The average user of the website is no longer the highly adept, technical user; they are, instead, the mass-market, non-technical user. As a direct result, many users abandon the website prior to completing a search for content. The obvious result is a significant loss of revenue to website operators, a substantial decrease in the efficiency and effectiveness of websites, and an increase in customer support costs.

Today, the primary way in which online support is provided to consumers is via "self-help" methods. These methods typically include lists of static help text, often called frequently asked questions (FAQs), that are stored within a document or are searched and received from a database. The static FAQ support method often only provides a general overview and can cause user frustration when trying to find answers to their questions. Additionally, users continue to experience difficulties since each website may use a different method of help. Part of the inefficiency of the old method is based on the fact that the user is directed to a static information source that was pertinent at the time the website was developed and for problems anticipated by the developers. As users become more knowledgeable, however, the initially anticipated problems may be replaced with more complex and sophisticated problems. The information source may be totally irrelevant to the particular problem encountered by the user initiating a specific request for support.

SUMMARY OF CERTAIN INVENTIVE ASPECTS

The system and method provide a modular self-help capability that can be attached to a website or other information source that can be searched and updated to modernize the help environment. The search component should be one that is context/category sensitive and should have the functionality to understand natural language queries. This dynamic environment should become "smarter" over time and should be able to track the questions and answers by a number of methods to assure the answers are up to date and that there is a high confidence match for the user's inquiry. The entire collection of data may reside in a centralized location where the information can be leveraged to answer a user's question and aid in the creation of question/answer pairs for later use. Additionally, the system should support a method for incorporating new content and answers from users and support persons that are categorized and stored in the foregoing description for later reference and use.

In one embodiment, the invention provides a method of providing user assistance information, the method comprising receiving a question from a user, identifying a context that is associated with the received question, and searching for at least one answer to the question, wherein the searching is based at least in part upon the identified context and the received question.

In another embodiment, the invention provides a system for providing user assistance, the system comprising a question module adapted to receive at least one question from a user, a context module adapted to identify at least one category that is associated with the context in which the question was received, and a knowledge module adapted to identify an answer to a received question, wherein the answer is derived using at least in part the identified category.

In a further embodiment, the invention provides a system for providing user assistance, the system comprising a suggestion module adapted to provide a list of questions and answers to a user in response to a request for assistance, wherein the list of questions and answers is customized based at least in part upon a category that is associated with the questions, and a statistics module adapted to provide the list of questions, wherein the list of questions includes a selected number of frequently asked questions that are associated with the category.

In another embodiment, the invention provides a system for providing user assistance, the system comprising a question module adapted to receive at least one question from a user, a context module adapted to identify at least one category that is associated with the context in which the question was received, a knowledge module adapted to identify an answer to a received question, wherein the answer is derived using at least in part the identified category, an authoring module adapted to identify unanswered questions and adapted to associate an answer with the unanswered questions, a statistics module adapted to provide a list of questions and answers that are associated with an identified category, and a suggestion module adapted to provide the list of questions and answers to the user in response to a request for assistance.

In another embodiment, the invention provides a system for providing user assistance, the system comprising a question module adapted to receive at least one question from a user, a context module adapted to identify at least one category that is associated with the context in which the question was received, and a knowledge module adapted to identify an answer to a received question, wherein the answer is derived using at least in part the identified category.

In a further embodiment, the invention provides a system for providing user assistance information, the system comprising means for receiving a question from a user, means for identifying a context that is associated with the received question, and means for searching for at least one answer to the question, wherein the searching is based at least in part upon the identified context and the received question.

In another embodiment, the invention provides a method of providing user assistance information, the method comprising identifying a context that is associated with a user, determining which of plurality of categories is associated with the identified context, identifying a plurality of most frequently asked questions that are associated with the determined category, and displaying the most frequently asked questions to the user.

In another embodiment, the invention provides a method of providing user assistance information, the method comprising determining a category that is associated with a user question, wherein the determined category is based at least in part upon which web page of a plurality of web pages the user has most recently accessed, identifying a plurality of most frequently asked questions that are associated with the category, and displaying the most frequently asked questions to the user.

In a further embodiment, the invention provides a method of providing user assistance information, the method comprising receiving a plurality of questions, determining whether the questions have an associated answer in a knowledge database, storing the unanswered questions, and storing answers for each of the unanswered questions in the knowledge database.

BRIEF DESCRIPTION OF THE DRAWINGS

The above and other aspects, features and advantages of the invention will be better understood by referring to the following detailed description, which should be read in conjunction with the accompanying drawings. These drawings and the associated description are provided to illustrate certain embodiments of the invention, and not to limit the scope of the invention.

DETAILED DESCRIPTION OF CERTAIN EMBODIMENTS

Figure 1:
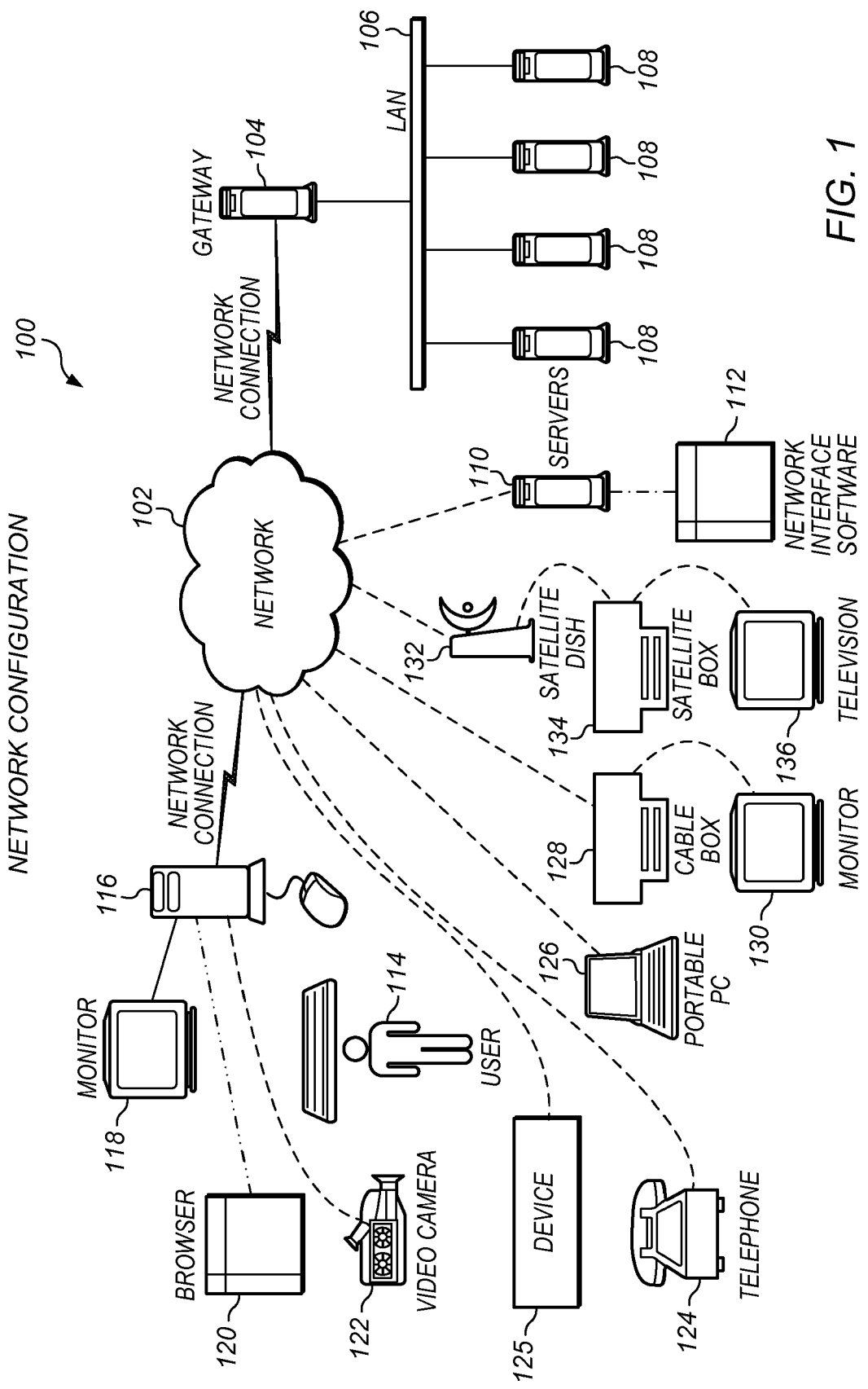
FIG. 1 is a diagram of one example of a network configuration in which a user assistance system may operate.

The following detailed description of certain embodiments presents various descriptions of specific embodiments of the present invention. However, the present invention can be embodied in a multitude of different ways as defined and covered by the claims. In this description, reference is made to the drawings wherein like parts are designated with like numerals throughout.

Technical Terms

The following provides a number of useful possible definitions of terms used in describing certain embodiments of the disclosed invention. In general, a broad definition of a term is desired when alternative meanings exist.

A network may refer to a network or combination of networks spanning any geographical area, such as a local area network, wide area network, regional network, national network, and/or global network. The Internet is an example of a current global computer network. Those terms may refer to hardwire networks, wireless networks, or a combination of hardwire and wireless networks. Hardwire networks may include, for example, fiber optic lines, cable lines, ISDN lines, copper lines, etc. Wireless networks may include, for example, cellular systems, personal communications service (PCS) systems, satellite communication systems, packet radio systems, and mobile broadband systems. A cellular system may use, for example, code division multiple access (CDMA), time division multiple access (TDMA), personal digital phone (PDC), Global System Mobile (GSM), or frequency division multiple access (FDMA), among others.

A website may refer to one or more interrelated web page files and other files and programs on one or more web servers. The files and programs are accessible over a computer network, such as the Internet, by sending a request using a protocol, for example hypertext transfer protocol (HTTP), specifying a uniform resource locator (URL) that identifies the location or generation of one of said web page files, wherein the files and programs are owned, managed or authorized by a single business entity. Such files and programs can include, for example, hypertext markup language (HTML) files, common gateway interface (CGI) files, and Java applications. The web page files preferably include a home page file that corresponds to a home page of the website. The home page can serve as a gateway or access point to the remaining files and programs contained within the website. In one embodiment, all of the files and programs are located under, and accessible within, the same network domain as the home page file. Alternatively, the files and programs can be located and accessible through several different network domains.

A web page or electronic page may comprise that which is presented by a standard web browser in response to an HTTP request specifying the URL by which the web page file is identified. A web page can include, for example, text, images, sound, video, and animation.

The Standard Generalized Markup Language (SGML) is an international standard for describing the structure and content of machine-readable information. SGML "documents" usually consist of text, graphics, and hypertext links. SGML identifies and names the parts of the information so that these parts can be managed and manipulated to create a variety of products as diverse as typesetting, indexing, CDROM distribution, serving as hypertext over the Web, and translation into foreign languages. The Extensible Markup Language (XML) is a derivative dialect of SGML designed for use on the World Wide Web and in Intranets. XML is essentially a stripped-down version of SGML. Thus, a valid XML document is generally also a valid SGML document. XML is therefore useful for implementing the most commonly used SGML features. Information on the specifications for SGML and XML can be found on the Internet at http://www.w3.org.

A computer or computing device may be any processor controlled device that permits access to the Internet, including terminal devices, such as personal computers, workstations, servers, clients, mini-computers, main-frame computers, laptop computers, a network of individual computers, mobile computers, palm-top computers, hand-held computers, set top boxes for a television, other types of web-enabled televisions, interactive kiosks, personal digital assistants, interactive or web-enabled wireless communications devices, mobile web browsers, pagers, cellular phones, or a combination thereof. The computers may further possess one or more input devices such as a keyboard, mouse, touch-pad, joystick, pen-input-pad, or other input device. The computers may also possess an output device, such as a visual display and an audio output. One or more of these computing devices may form a computing environment.

These computers may be uni-processor or multi-processor machines. Additionally, these computers may include an addressable storage medium or computer accessible medium, such as random access memory (RAM), an electronically erasable programmable read-only memory (EEPROM), programmable read-only memory (PROM), erasable programmable read-only memory (EPROM), hard disks, floppy disks, laser disk players, digital video devices, compact disks, video tapes, audio tapes, magnetic recording tracks, electronic networks, and other techniques to transmit or store electronic content such as, by way of example, programs and data. In one embodiment, the computers are equipped with a network communication device such as a network interface card, a modem, or other network connection device suitable for connecting to the communication network. Furthermore, the computers execute an appropriate operating system such as Linux, Unix, any of the versions of Microsoft Windows, Apple MacOS, IBM OS/2 or other operating system. The appropriate operating system may include a communications protocol implementation that handles all incoming and outgoing message traffic passed over the Internet. In other embodiments, while the operating system may differ depending on the type of computer, the operating system will continue to provide the appropriate communications protocols to establish communication links with the Internet.

The computers may contain program logic, or other substrate configuration representing data and instructions, which cause the computer to operate in a specific and predefined manner, as described herein. In one embodiment, the program logic may be implemented as one or more object frameworks or modules. These modules may be configured to reside on the addressable storage medium and configured to execute on one or more processors. The modules include, but are not limited to, software or hardware components that perform certain tasks. Thus, a module may include, by way of example, components, such as, software components, object-oriented software components, class components and task components, processes, functions, attributes, procedures, subroutines, segments of program code, drivers, firmware, microcode, circuitry, data, databases, data structures, tables, arrays, and variables.

The various components of the system may communicate with each other and other components comprising the respective computers through mechanisms such as, by way of example, interprocess communication, remote procedure call, distributed object interfaces, and other various program interfaces. Furthermore, the functionality provided for in the components, modules, and databases may be combined into fewer components, modules, or databases or further separated into additional components, modules, or databases. Additionally, the components, modules, and databases may be implemented to execute on one or more computers. In another embodiment, some of the components, modules, and databases may be implemented to execute on one or more computers external to the website. In this instance, the website includes program logic, which enables the website to communicate with the externally implemented components, modules, and databases to perform the functions as disclosed herein.

DESCRIPTION OF THE FIGURES

FIG. 1 is a diagram of one example of a network configuration 100 in which a user assistance system may operate. However, various other types of electronic devices communicating in a networked environment may also be used. In this example, a user 114 communicates with a computing environment, which may include multiple server computers 108 or a single server computer 110 in a client/server relationship on a network transmission medium 102. The user 114 may include a plurality of types of users, for example an end user, an author, an administrator, or other users that may be accessing the computing environment for a variety of reasons. In a typical client/server environment, each of the server computers 108, 110 may include a server program that communicates with a user device 116, which may be a personal computer (PC), a hand-held electronic device (such as a PDA), a mobile or cellular wireless phone, a laptop computer, a TV set, or any number of other electronic devices.

The server computers 108, 110, and the user device 116 may each have any conventional general purpose single- or multi-chip microprocessor, for example a Pentium processor, a Pentium Pro processor, a MIPS processor, a Power PC processor, an ALPHA processor, or other general purpose processors. In addition, the microprocessor may be any conventional special purpose microprocessor such as a digital signal processor or a graphics processor. Additionally, the server computers 108, 110 and the user device 116 may be desktop, server, portable, hand-held, set-top, or other desired type of computing device. Furthermore, the server computers 108, 110 and the user device 116 each may be used in connection with various operating systems, including, for example, UNIX, LINUX, Disk Operating System (DOS), VxWorks, PalmOS, OS/2, Mac OS, a version of Microsoft Windows, or other operating system.

The server computers 108, 110 and the user device 116 may each include a network terminal equipped with a video display, keyboard and pointing device. In one embodiment of the network configuration 100, the user device 116 includes a network browser 120 used to access the server computers 108, 110. The network browser 120 may be, for example, Microsoft Internet Explorer or Netscape Navigator. The user 114 at the user device 116 may utilize the browser 120 to remotely access the server program using a keyboard and/or pointing device and a visual display, such as a monitor 118. Although FIG. 1 shows only one user device 116, the network configuration 100 may include any number and type of user devices.

The network 102 may be any type of electronic transmission medium, for example, including but not limited to the following networks: a virtual private network, a public Internet, a private Internet, a secure Internet, a private network, a public network, a value-added network, an intranet, an extranet, or a wireless gateway. In addition, the connectivity to the network 102 may be, for example, via a modem, Ethernet (IEEE 802.3), Token Ring (IEEE 802.5), Fiber Distributed Datalink Interface (FDDI), Asynchronous Transfer Mode (ATM), Wireless Application Protocol (WAP), or other form of network connectivity. The user device 116 may connect to the network 102 by use of a modem or by use of a network interface card that resides in the user device 116. The server computers 108 may be connected via a local area network 106 to a network gateway 104, which provides access to the local area network 106 via a high-speed, dedicated data circuit.

As would be understood by one skilled in the technology, devices other than the hardware configurations described above may be used to communicate with the server computers 108, 110. If the server computers 108, 110 are equipped with voice recognition or Dual Tone Multi-Frequency (DTMF) hardware, the user 114 may communicate with the server computers by use of a telephonic device 124. The telephonic device 124 may optionally be equipped with a display screen and a browser 120. Other examples of connection devices for communicating with the server computers 108, 110 include a portable personal computer (PC) 126 or a personal digital assistant (PDA) device with a modem or wireless connection interface, a cable interface device 128 connected to a visual display 130, or a satellite dish 132 connected to a satellite receiver 134 and a television 136. Still other methods of allowing communication between the user 114 and the server computers 108, 110 are additionally within the scope of the invention and are shown in FIG. 1 as a generic user device 125. The generic user device 125 may be any of the computing or communication devices listed above, or any other similar device allowing a user to communicate with another device over a network.

Additionally, the server computers 108, 110 and the user device 116 may be located in different rooms, buildings or complexes. Moreover, the server computers 108, 110 and the user device 116 could be located in different geographical locations, for example in different cities, states or countries. This geographic flexibility which networked communications allows is within the scope of the invention.

Figure 2:
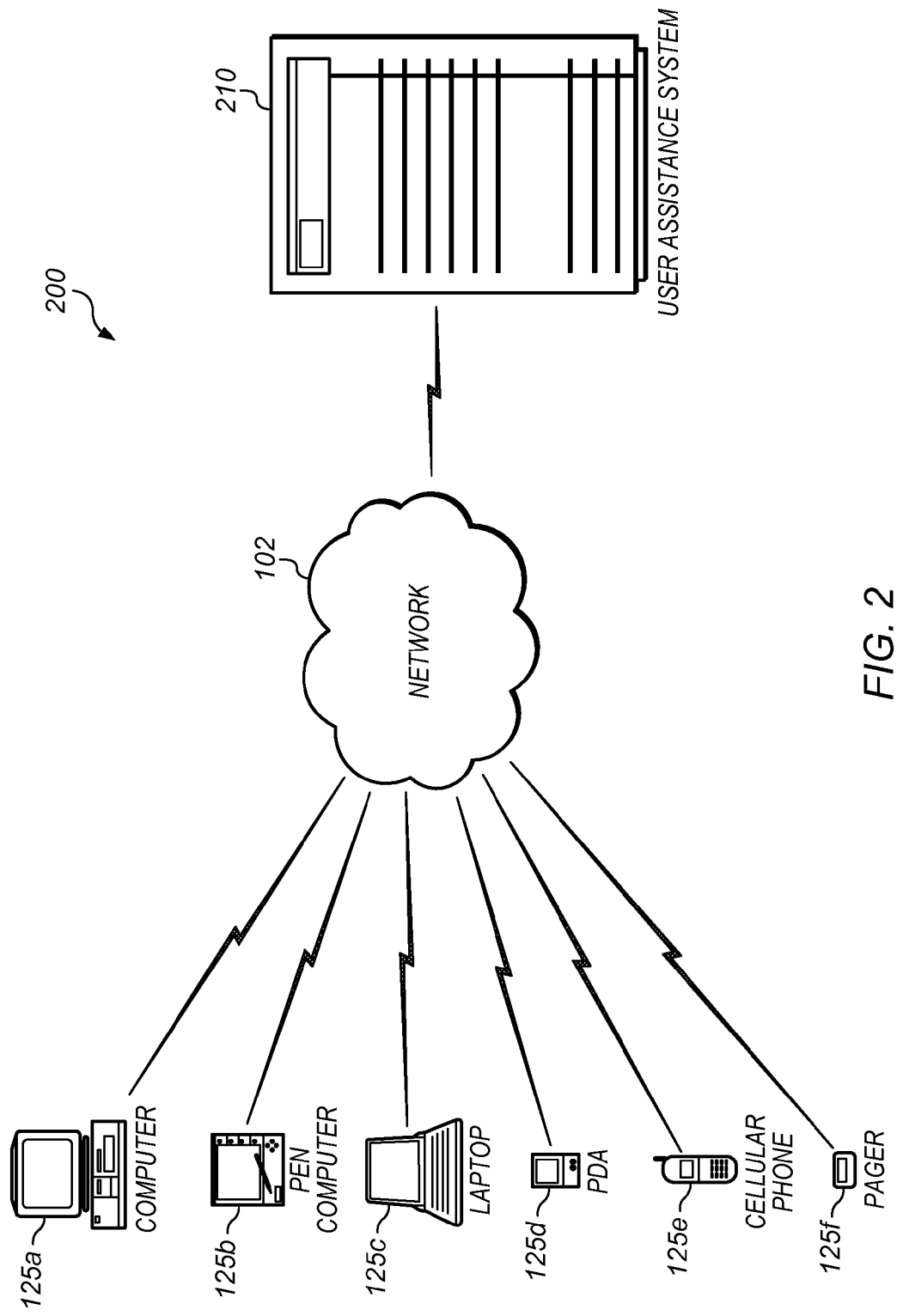
FIG. 2 is a diagram of a network configuration in accordance with one embodiment of a user assistance system.

FIG. 2 is a further diagram of a network configuration 200 in accordance with one embodiment of a user assistance system 210. In this embodiment, the user assistance system 210 includes one or more computing devices, such as generally discussed above in relation to FIG. 1, executing certain instructions which are typically grouped into modules. The modules may include software or hardware components that perform certain tasks or operations. In the case where the modules include software components, these may be written in one or more of a variety of programming languages, for example C, C++, BASIC, Pascal, Java, FORTRAN, or a markup language such as HTML, standard generalized markup language (SGML) or extensible markup language (XML), and run under any well-known operating system. C, C++, BASIC, Pascal, Java, FORTRAN, and HTML are industry standard programming languages for which many commercial compilers or interpreters can be used to create executable code or perform certain tasks or operations.

The user assistance system 210 as shown in FIG. 2 is in data communication with one or more user devices 125a, 125b, 125c, 125d, 125e, 125f via the network 102. The network connectivity and communication is discussed in further detail above in relation to FIG. 1. The user devices 125a, 125b, 125c, 125d, 125e, 125f shown are for example purposes and are not limited to those devices shown, but additionally include any number of other computing or communication devices. The user devices 125a, 125b, 125c, 125d, 125e, 125f are in certain instances hereinafter collectively referred to as the user device 125, and such collective reference should be read to include any one or more of the devices 125a, 125b, 125c, 125d, 125e, 125f shown in FIG. 2, or other similar computing or communication device not specifically shown in FIG. 2.

Figure 3:
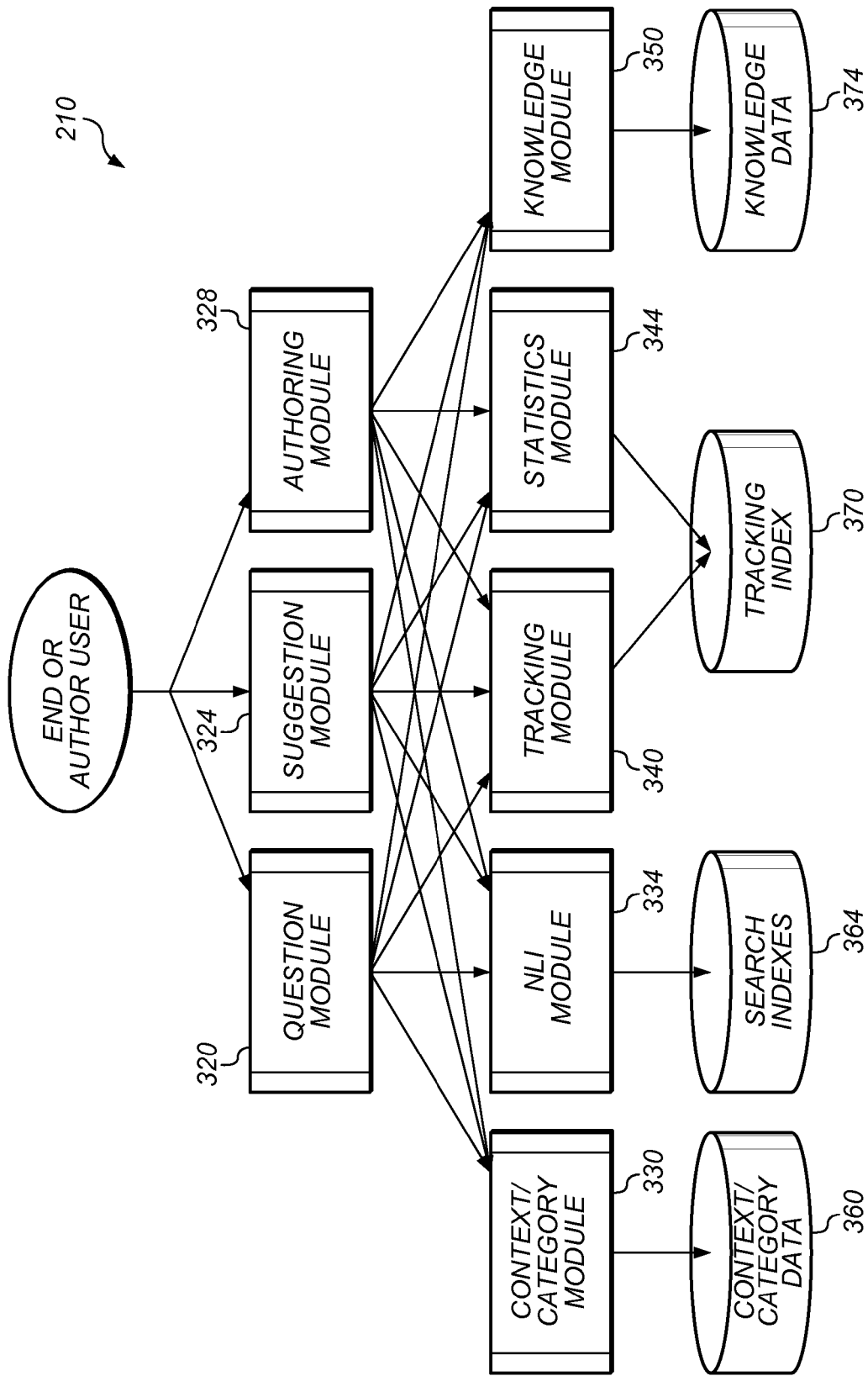
FIG. 3 is a block diagram of certain modules and data storage areas comprising one embodiment of the user assistance system shown in FIG. 2.

FIG. 3 is a block diagram of certain modules and data storage areas comprising one embodiment of the user assistance system 210 shown in FIG. 2. In this embodiment, depending on the type of assistance a user requests at stage 310, the system 210 invokes a question module 320, a suggestion module 324, or an authoring module 328. The question module 320, described in further detail below in relation to FIG. 5, displays results, for example on a monitor 118 such as shown in FIG. 1, for a user's question and logs the question in the appropriate data storage area. The suggestion module 324, described in further detail below in relation to FIG. 6, displays question/answer pair results, for example, in order of the frequency the question has been previously asked by users 114, and allows the user 114 to select a certain question/answer pair for further display. The question/answer pair results may be displayed on a monitor 118 such as shown above in FIG. 1. The authoring module 328, described in further detail below in relation to FIG. 7, displays unanswered questions, for example, in order of the frequency the question has been previously asked, and allows an author user (not shown) to provide an answer for one or more previously unanswered questions.

The embodiment of the user assistance system 210 shown in FIG. 2 additionally includes a context/category module 330. The context/category module 330, described in further detail below in relation to FIG. 8, returns one or more categories for a certain context, for example by a context/category mapping or other way of associating one or more categories to a context. The user assistance system 210 further includes a natural language index (NLI) module 334, described in further detail below in relation to FIG. 9, that invokes an NLI technology application or module to perform a natural language index analysis corresponding to a certain search category and returns the NLI results. The NLI technology may be a third party application or another module or modules of the user assistance system 210.

The user assistance system 210 further includes a tracking module 340. In this embodiment, the tracking module 340, described in further detail below in relation to FIG. 10, writes answered and unanswered questions, question/answer pairs, or other usage information to a tracking data storage area 370. The tracking data storage area 370 may be one or more database or types of databases, for example SQL, one or more computer disk drive, computer memory, or other similar area or device in which data may be stored. The user assistance system 210 further includes a statistics module 344. The statistics module 344, described in further detail below in relation to FIG. 11, arranges tracking data using certain criteria, for example most frequently asked questions, least frequently asked questions, most frequently unanswered questions, or other types of statistical queries. The statistics module 344 returns the list of questions requested based on the query type. The user assistance system 210 further includes a knowledge module 350. The knowledge module 350, described in further detail below in relation to FIG. 12, reads a knowledge data storage area 374 for answers or question/answer pairs and returns the specified item or items, or writes a new answer or question/answer pair to the knowledge data storage area 374.

Figure 4:
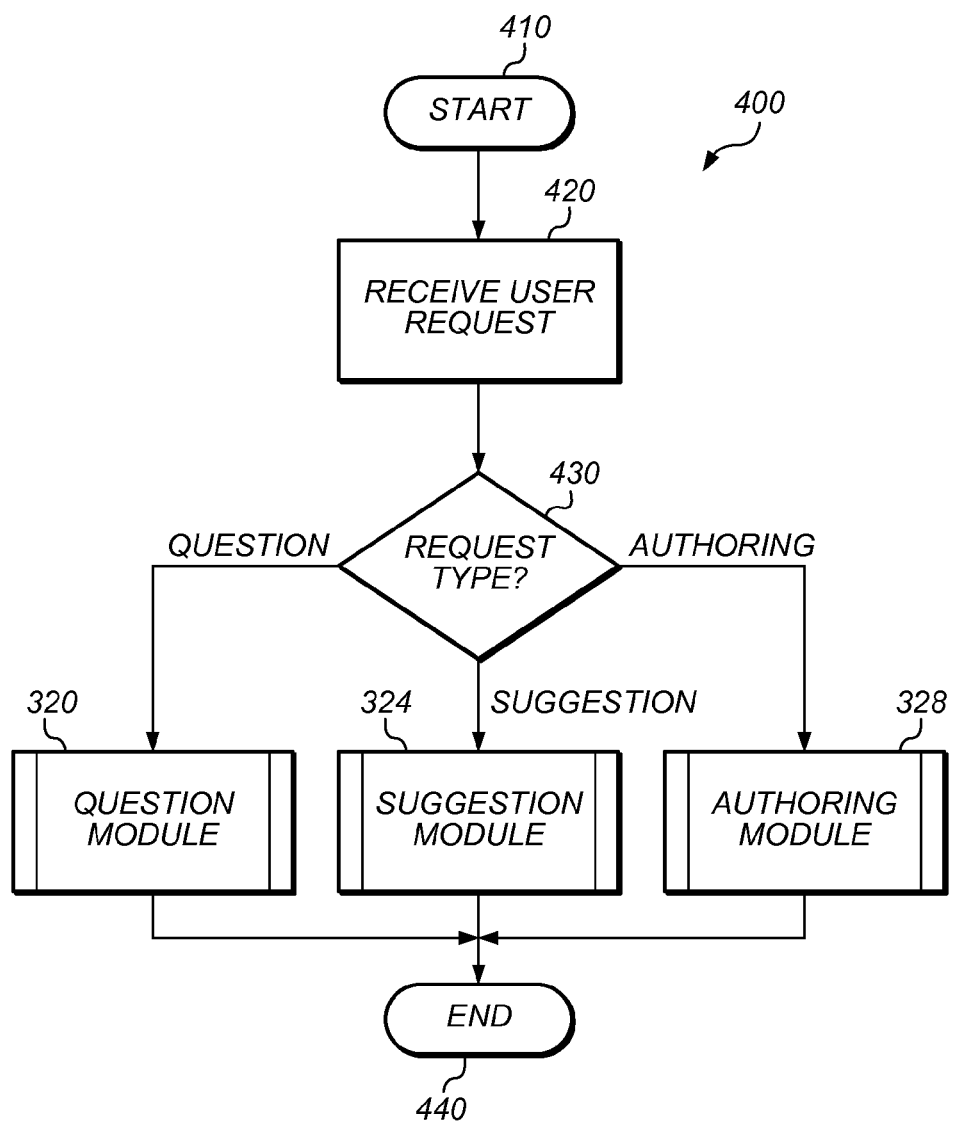
FIG. 4 is a flowchart of a top-level process of the user assistance system shown in FIGS. 2 and 3.

FIG. 4 is a flowchart of a top-level process 400 of the user assistance system 210 shown in FIGS. 2 and 3. In this embodiment, the process 400 includes a start stage 410, which includes, for example, initialization or other module startup processing. The top-level process 400 further includes a stage 420 that receives user requests. At this stage, the user assistance system 210 allows the user 114 to indicate the type of assistance desired, which includes asking a question in a textual format, requesting the system 210 present one or more frequently asked question (FAQ) suggestions, requesting the system 210 to enable the entry of answers to previously unanswered questions, or other types of user assistance. At decision stage 430, the system 210 invokes the question module 320 in the instance where the user 114 indicates the desire to receive assistance in response to a textual question. The operation of the question module 320 is described in further detail below in relation to FIG. 5.

Alternatively, at decision stage 430, the system 210 invokes the suggestion module 324 in the instance where the user 114 indicates the desire to receive assistance in the form of frequently asked question/answer pairs. The operation of the suggestion module 324 is described in further detail below in relation to FIG. 6. Alternatively, at decision stage 430, the system 210 invokes the authoring module 328 in the instance where the user 114, for example an author user, customer service representative, or other user authorized to update the knowledge data 374, indicates the desire to provide answers for previously unanswered questions asked by a previous user or users. The operation of the authoring module 328 is described in further detail below in relation to FIG. 7. In addition to the user assistance request types shown in the embodiment of FIG. 4 and described herein, other request types are also possible and are within the scope of the invention. The top-level process 400 further includes an end stage 440, which includes, for example, termination processing such as the return of parameters to the calling module, the closing of certain files or devices, or other termination processing.

Figure 5:
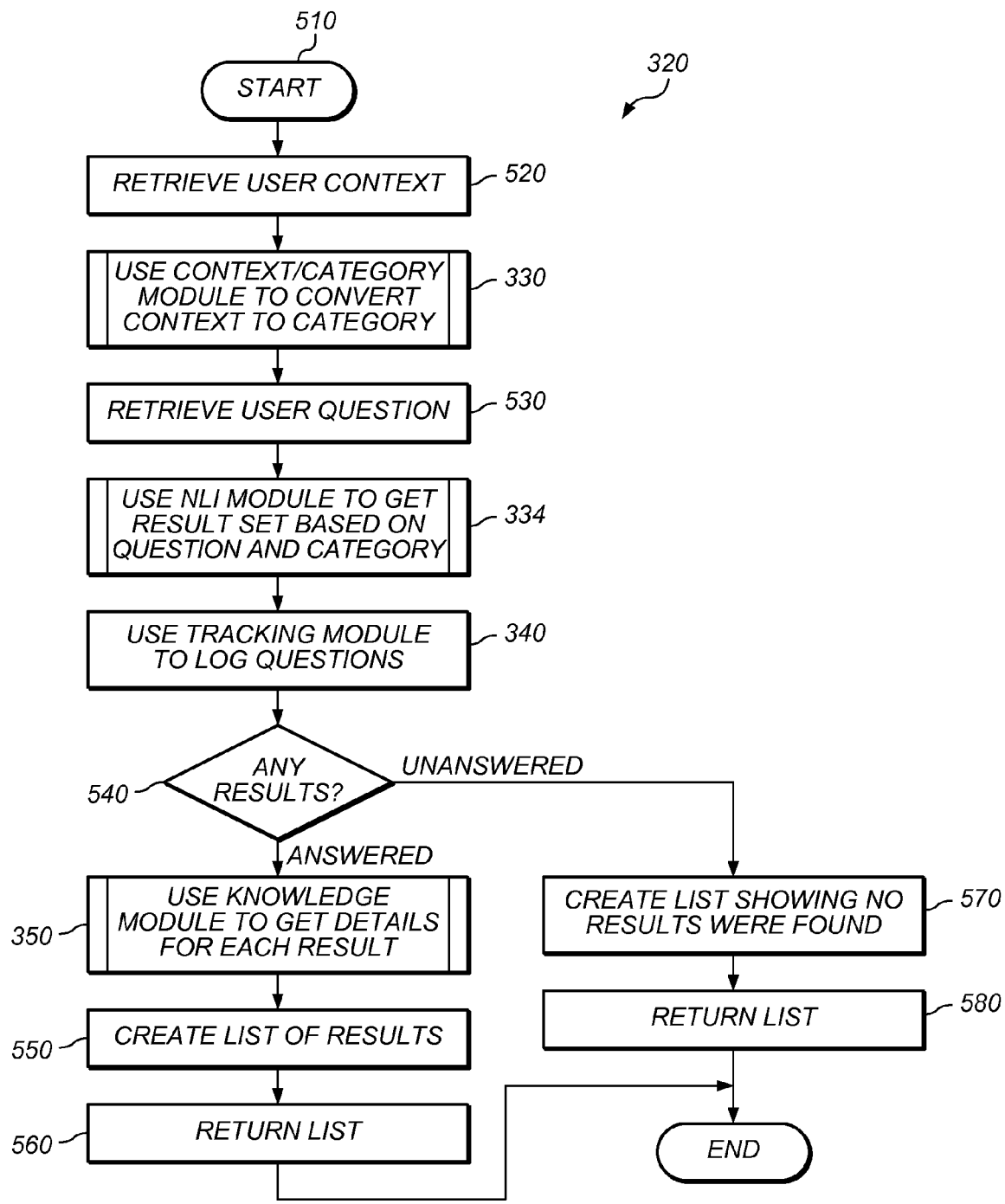
FIG. 5 is a flowchart of a process of searching for and returning an answer to a question as performed by the question module shown in FIGS. 3 and 4.

FIG. 5 is a flowchart of a process of searching for and returning an answer to a question as performed by the question module 320 shown in FIGS. 3 and 4. In this embodiment, the question module process 320 includes a start stage 510, which includes, for example, an initialization or other module startup processing. At stage 520, the question module process 320 retrieves the user context from which the user assistance request was issued. In this embodiment, the user assistance request includes a request for the system to display to the user 114 an answer to the textual question entered, for example on a monitor 118 such as shown above in FIG. 1, but may also include other types of user assistance requests and responses. In one embodiment, the user context includes the identity or location of an electronic page, such as a web page, from which a user request for assistance originates, a list of recent web page accesses, a type of medium, for example website, email, or intranet, a time or date of access, the requesting system, for example a computing platform, operating system or web browser, or other similar situational, positional or locality information from which a user assistance request originates. At stage 330, the question module 320 invokes the context/category module 330, which is described in further detail below in relation to FIG. 8. The context/category module 330 converts a user request context to a category by searching stored context maps for a match and accessing the category associated with the context. As an example, a context to category mapping may include web page associations such as "www.ehelp.com/sales→sales," "www.ehelp.com/robohelp/sales→sales," or "www.ehelp.com/support→support." This list is not intended to be all-inclusive but instead illustrative, as many other context to category associations are possible, as well as many other types of contexts in addition to web pages.

The question module process 320 further includes a retrieve user question stage 530, which includes receiving a user request for assistance and may be in the form of a textual question. A textual question may include many forms, such as a natural language question (for example "How do I create a topic?"), a short phrase (for example "create topic"), a set of words (for example "topic create"), or other question forms. At stage 334, the question module process 320 invokes the NLI module process 334, which is described in further detail below in relation to FIG. 9, with the question retrieved at stage 530. The NLI module 334 attempts to obtain a result based on the retrieved question and the category converted from the context at stage 330.

At stage 340, the question module process 320 invokes the tracking module process 340, which is described in further detail below in relation to FIG. 10, with the question result data from the NLI module 334 based on the text entered by the user 114. The tracking module 340 logs the NLI module 334 question result data for statistical analysis or other processing purposes to one or more data storage area, for example the tracking data storage area 370.

At decision stage 540, the question module process 320 determines whether the NLI module 334 was successful in providing a question result set. In this embodiment, the decision at stage 540 is based on a confidence threshold being met, for results may be returned if the threshold is above a certain value, such as 80% or higher. If the result set includes an answered question, the knowledge module process 350 is invoked to obtain details for such question result, for example a category associated with a question or a confidence threshold value. The knowledge module 350 is described in further detail below in relation to FIG. 12. At stage 550, the question module 320 creates a list of results as obtained by the knowledge module 350. This list of results may be returned as shown by stage 560 to the module that invoked the question module 320, for example as a module calling parameter or parameter list.

Alternatively, if decision stage 540 determines the result is an unanswered question, at stage 570 the question module 320 generates a response showing that no results were found for the question that was posed by the user 114, or some other generic response may be generated. The list showing that no results were found is then returned at stage 580 to the invoking module, for example as a module calling parameter or parameter list. The question module process 320 further includes an end stage 590, which includes, for example, termination processing such as the transfer of return parameters to the calling module, the closing of files or devices, or other termination processing.

Figure 6:
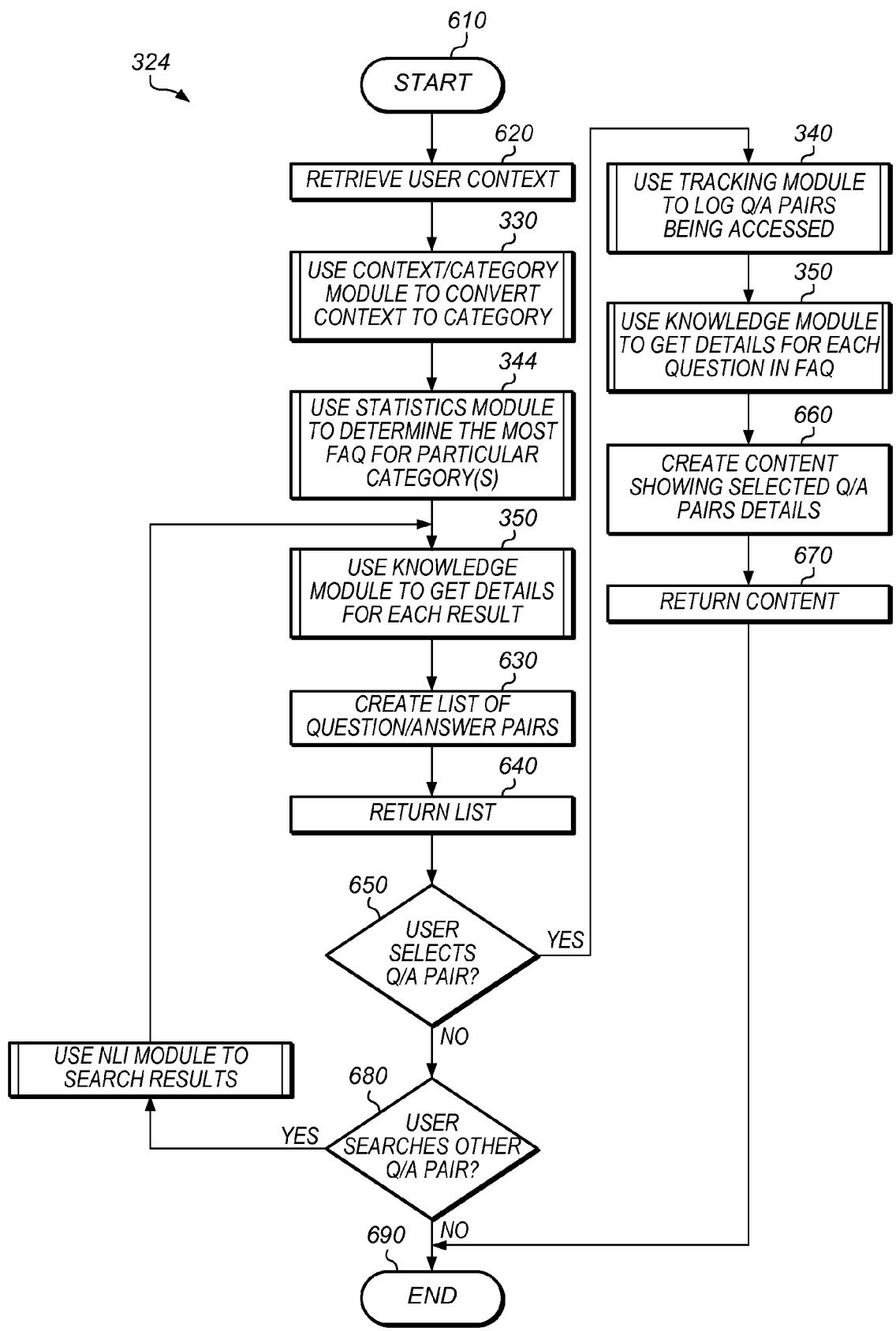
FIG. 6 is a flowchart of a process of searching for and returning a list of frequently asked questions as performed by the suggestion module shown in FIGS. 3 and 4.

FIG. 6 is a flowchart of a process of searching for and returning a list of frequently asked questions as performed by the suggestion module 324 shown in FIGS. 3 and 4. In this embodiment, the suggestion module process 324 includes a start stage 610, which includes, for example, an initialization or other module startup processing. At stage 620, the suggestion module process 324 retrieves the user context from which the user assistance request was issued. In this embodiment, the user assistance request includes a request for the system to display to the user 114 a list of frequently asked question/answers pairs, for example on a monitor 118 such as shown above in FIG. 1, but may also include other types of user assistance requests. At stage 330, the suggestion module 324 invokes the context/category module 330, which is described in further detail below in relation to FIG. 8. The context/category module 330 converts a user request context to a category by searching stored context maps for a match and accessing the category associated with the context. At stage 344, the suggestion module 324 invokes the statistics module 344, which is described in further detail below in relation to FIG. 11. In one embodiment, the statistics module 344 determines the most frequently asked question or questions for a certain category or categories. The suggestion module 324 further includes the knowledge module stage 350, which obtains, for example, answers, details, or other information, for each question in the list of frequently asked questions. The details obtained by the knowledge module 350 may include, for example, a category or categories or a confidence threshold value for the question/answer pair.

At stage 630, the suggestion module 324 creates a list of question/answer pairs from the answers or other details obtained by the knowledge module as shown by stage 350. The list may be arranged for return to the module that invoked the suggestion module 324, or may be stored for access by other modules. At decision stage 650, the suggestion module determines whether the user 114 selects a question/answer pair for further display, for example on a monitor 118 such as shown above in FIG. 1. In this embodiment, at this stage 650 the user 114 selects a certain question from a list of frequently asked questions for which the answer would be more likely to be the answer that relates to the user assistance that is presently being sought by the user 114. If the user selects a certain question/answer pair from the list of questions, at stage 340 the suggestion module 324 invokes the tracking module 340 to log the question/answer pair or pairs that the user 114 is accessing. The tracking module 340, which is described in further detail below in relation to FIG. 10, logs the access of the question/answer pair to allow the statistics module 344, at a later time, to determine the frequency the question/answer pairs are accessed. The suggestion module 324 invokes the knowledge module 350 to obtain details, which may include the answer, category, or other details, for the question the user selects. At stage 660, the suggestion module 324 creates a list of details for questions/answer pairs selected by the user 114 for further viewing of the details for the question. At stage 670, the suggestion module 324 returns the content of question/answer pairs created at stage 660 to the user 114 for satisfying the user's request for assistance. The suggestion module continues at the end stage 690 as described below.

Alternatively, if decision stage 650 determines that the user 114 did not select a question/answer pair related to the user request for assistance, stage 680 determines whether the user 114 requests to search other question/answer pairs to satisfy the request for assistance. If the user 114 requests to search other question/answer pairs, at stage 334 the NLI module is invoked to search for additional results based on an additionally natural language question entered by the user 114. The suggestion module 324 continues at stage 350 as described above. Alternatively, if decision stage 680 determines that the user requests not to search other question/answer pairs, the suggestion module 324 continues at the end stage 690. The end stage 690 includes, for example, termination processing such as the transfer of return parameters to the calling module, the closing of files or devices, or other termination processing.

Figure 7:
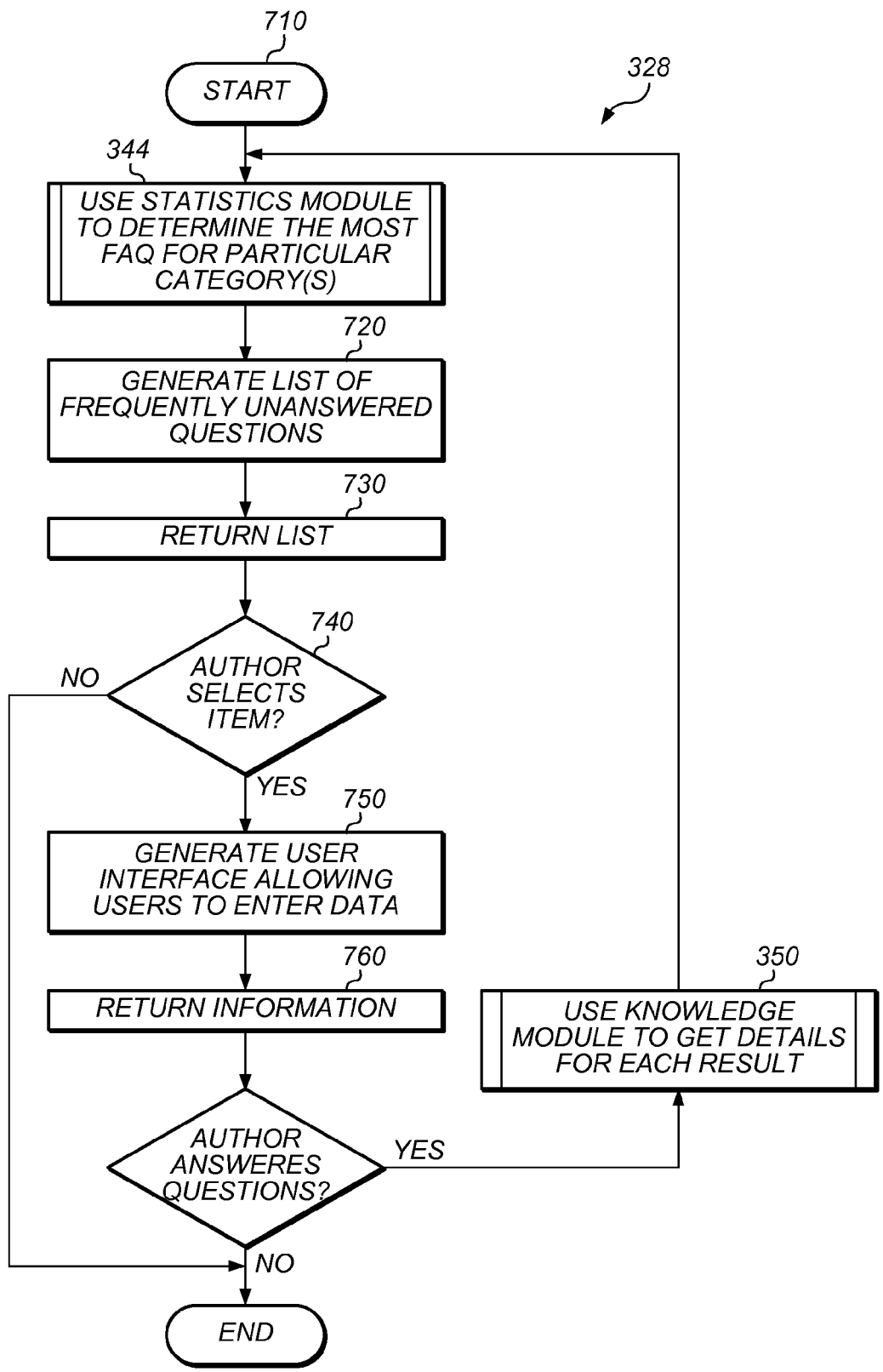
FIG. 7 is a flowchart of a process of displaying unanswered questions and accepting associated answers as performed by the authoring module shown in FIGS. 3 and 4.

FIG. 7 is a flowchart of a process of displaying unanswered questions and accepting associated answers as performed by the authoring module 328 shown in FIGS. 3 and 4. Operations provided by the authoring module 328 include, for example, allowing a content author such as a customer service representative (CSR) to enter answers to unanswered questions. In this embodiment, the authoring module process 328 includes a start stage 710, which includes, for example, initialization processing or other module startup processing. At stage 344, the authoring module 328 invokes the statistics module 344 to determine frequently unanswered questions. The statistics module 344 is described in further detail below in relation to FIG. 11. At stage 720, the authoring module 328 generates a list of frequently unanswered questions from the information obtained by the statistics module at stage 344. The unanswered questions may be represented to the author user 114 in a variety of formats or layouts, but typically the most frequently requested unanswered questions are shown near the top of the list so that the author 114 may realize that the effectiveness of the user assistance system 210 may be enhanced by provided answers to these questions prior to less frequently asked unanswered questions. The authoring module 328 returns the list of unanswered questions at stage 730 to allow the display of the questions to an authorized user 114, for example on a monitor 118 such as shown above in FIG. 1.

At decision stage 740, the authoring module 328 determines whether the author 114 selects an unanswered question from the list returned at stage 730. In the instance where the author 114 does not select an unanswered question, the authoring module 328 continues to an end stage 780. Alternatively, where the author 114 selects a question from the returned list of unanswered questions, the authoring module 328 generates user interface capabilities at stage 750 that allow authors 114 to enter answers, locations of answers, or locations of existing data, or additionally to enter context or category information such as locations for questions. At stage 760, the electronic page or pages allowing the author 114 to enter answers to questions is returned to allow the display of the information to an authorized 114, for example on a monitor 118 such as shown above in FIG. 1. The authoring module 328 determines whether the author has chosen to answer questions at decision stage 770. In the instance where the author answers one or more previously unanswered questions, the authoring module 328 invokes the knowledge module 350 to add the question/answer pair to the knowledge data storage area 374. The authoring module 328 continues at the statistics module stage 344 as described above in relation to FIG. 7. Alternatively, in the instance where the author does not answer any questions, the authoring module continues at the end stage 780. The end stage 780 includes, for example, termination processing such as the transfer of return parameters to the calling module, the closing of files or devices, or other termination processing.

Figure 8:
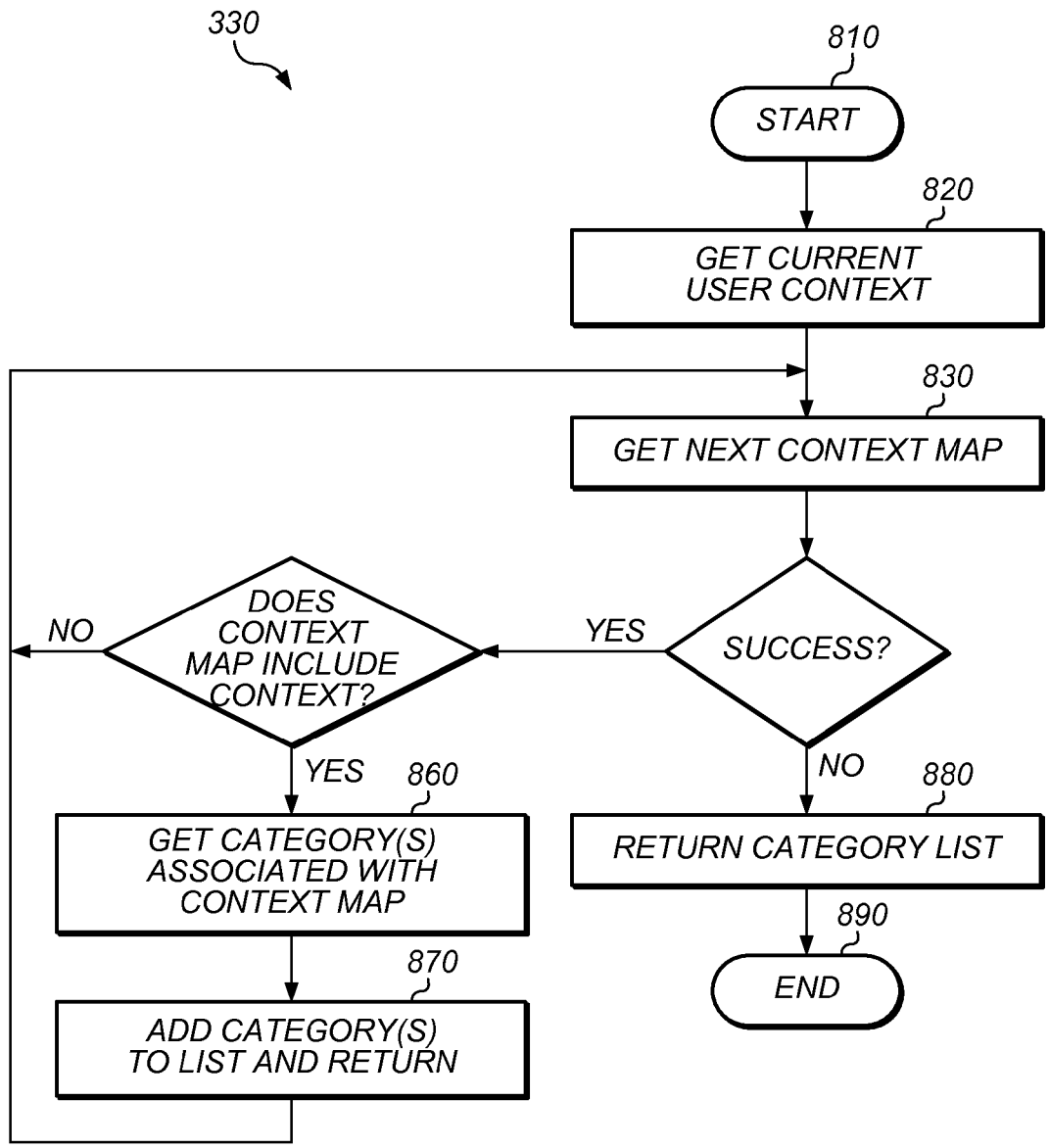
FIG. 8 is a flowchart of a process of returning a category associated with a context as performed by the context/category module shown in FIGS. 3, 5 and 6.

FIG. 8 is a flowchart of a process of returning a category associated with a context as performed by the context/category module 330 shown in FIGS. 3, 5 and 6. In this embodiment, the context/category module process 330 includes a start stage 810, which includes, for example, initialization processing or other module startup processing. At stage 820, the context/category module 330 obtains, for example by passing as a module calling parameter, the current user context information. At stage 830, the context/category module 330 obtains the next context map from a context/category data storage area 360 (see FIG. 3). The mapping may include a basic lookup table, but a more elaborate dynamic scheme is additionally within the scope of the invention. As one example, the context maps may be a list of anticipated contexts for which the associated category may be stored in the context/category data 360. In this example, as described as follows for FIG. 8, each context map in the list is searched for matching categories. The context/category data storage area 360 may be one or more database or types of databases, for example SQL, one or more computer disk drive, computer memory, or other similar area or device in which data may be stored.

At decision stage 840, the context/category module 330 determines whether the next context map was obtained at stage 830. In the instance where the next context map was obtained successfully, the context/category module 330 continues at decision stage 850, which determines whether the context map obtained includes the context for which mapping is requested. In the instance where the context map does not include the requested context, the context/category module 330 continues at stage 830 to obtain the next context map as described above. In the instance where the context map does include the requested context, the context/category module 330 continues at stage 860. At stage 860, the context/category module 330 obtains the category or categories associated with the context map that includes the requested context. The category or categories may be saved to return to the calling module at stage 870. In one embodiment, certain requested context maps to one or more associated categories, and to return multiple categories, a list of categories may be saved having none, one, or more than one categories. The context/category module 330 continues at stage 830 to obtain the next context map as described above.

Alternatively, in the instance where decision stage 840 determines that the next context map was not obtained successfully, the context/category module 330 continues at stage 880 by returning the category list described above having the list of categories associated with the requested context. The context/category module 330 continues at an end stage 890. The end stage 890 includes, for example, termination processing such as the transfer of return parameters to the calling module, the closing of files or devices, or other termination processing.

Figure 9:
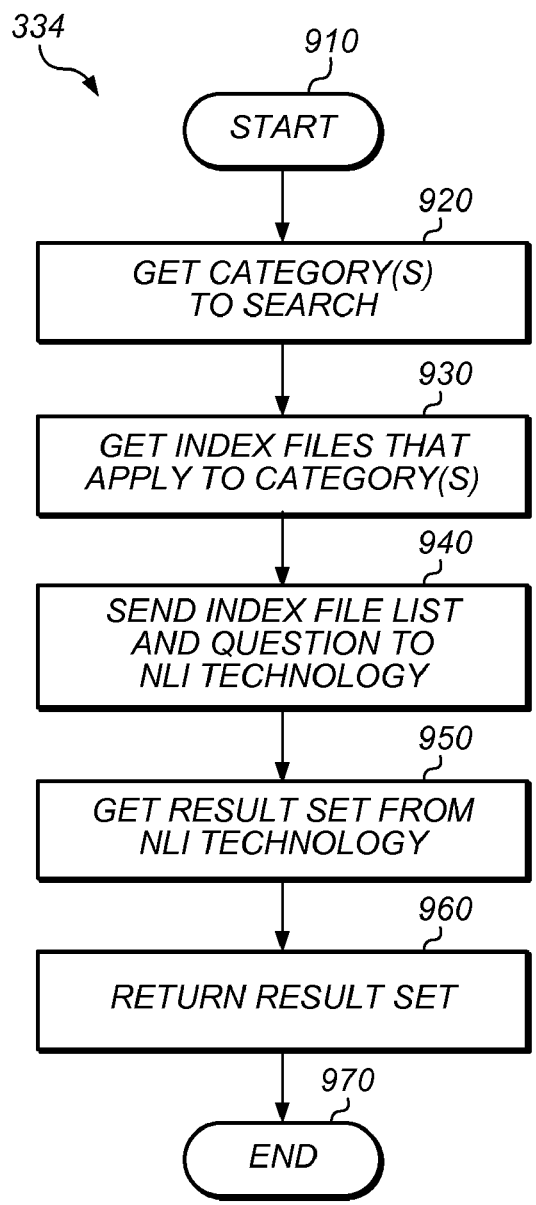
FIG. 9 is a flowchart of a process of natural language analysis as performed by the natural language index (NLI) module shown in FIGS. 3, 5 and 6.

FIG. 9 is a flowchart of a process of natural language analysis as performed by the natural language index (NLI) module 334 shown in FIGS. 3, 5 and 6. Natural language requests are typically be in the form of a question as would be asked using natural language terms and format, for example "How do I create a topic?" In this embodiment, the NLI module process 334 includes a start stage 910, which includes, for example, initialization processing or other module startup processing. At stage 920, the NLI module 334 obtains the category or categories to search, for example passed as a module calling parameter. The NLI module 334 obtains index files, for example from a search index data storage area 364 (see FIG. 3), that pertain to the category obtained at stage 920. In one embodiment, the index files may be obtained from a search index data storage area, for example a database, a file stored on disk or other storage media, or other data storage mechanism. At stage 940, the NLI module 334 sends the index file list and requested question to the NLI technology module or application. The NLI technology may be a third party application, may be included in the user assistance system 210, or may be integrated or invoked in still further ways. The NLI technology may be the processing engine that performs the natural language interpretation and processing and produces a result of the processing. In further embodiments, NLI search techniques include keyword searches, binary searches, full text searches, or other search techniques.

At stage 950, the NLI module 334 obtains the result set from the NLI technology. The NLI technology may be a third party application or another module or modules of the user assistance system 210. One example of such a third party application is the T-PORT/NLI product from Sail Labs Holdings N.V. of Antwerp, Belgium. The NLI module 334 returns result set information at stage 960. The result set information may be returned in a plurality of ways, for example as returned module calling parameters, stored for access by other modules, or other manners of returning data from a module. The NLI module 334 continues at an end stage 970. The end stage 970 includes, for example, termination processing such as the transfer of return parameters to the calling module, the closing of files or devices, or other termination processing.

Figure 10:
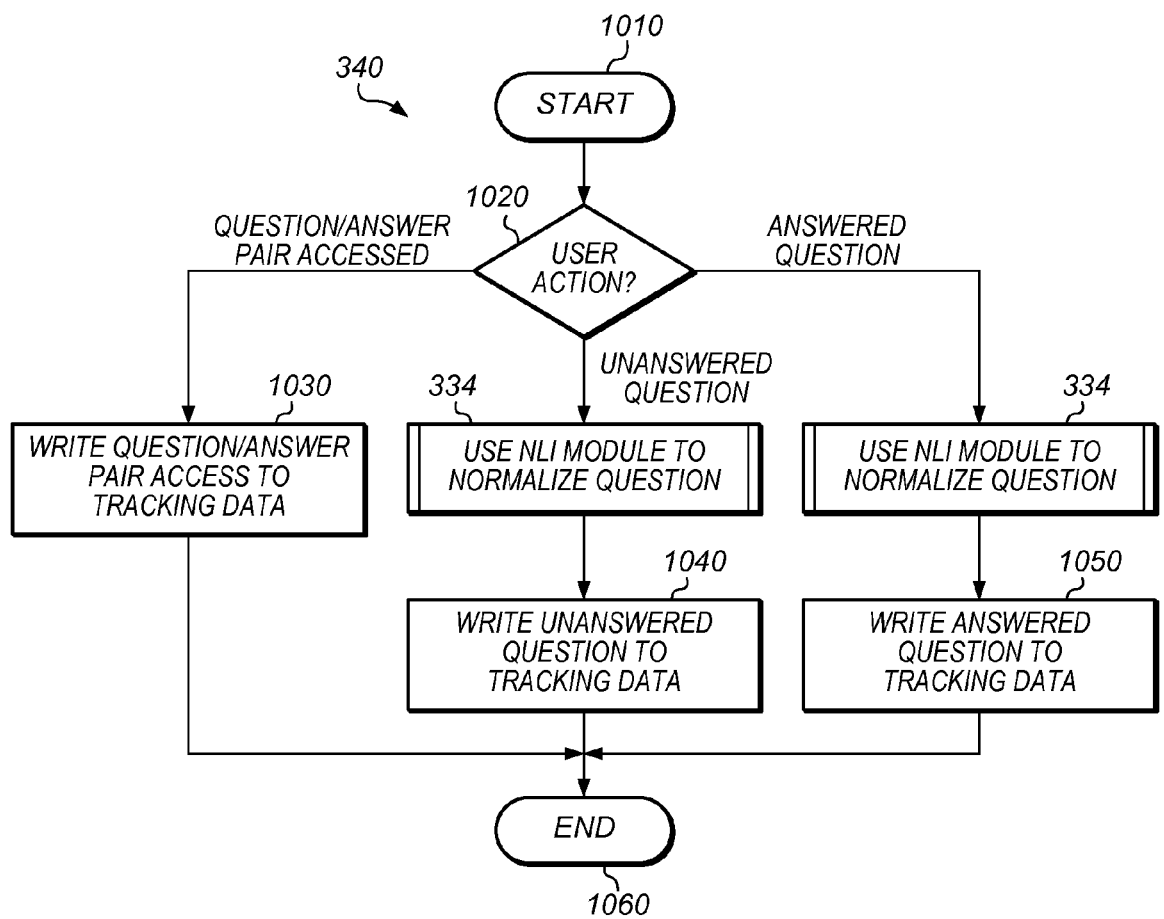
FIG. 10 is a flowchart of a process of updating tracking information as performed by the tracking module shown in FIGS. 3 and 5.

FIG. 10 is a flowchart of a process of updating tracking information as performed by the tracking module 340 shown in FIGS. 3 and 5. In this embodiment, the tracking module process 340 includes a start stage 1010, which includes, for example, initialization processing or other module startup processing. At decision stage 1020, the tracking module 340 determines the type of user action to perform. In the instance where the user action is to track an answered question, the tracking module 340 continues to invoke the NLI module at stage 334. The NLI module 334, which is described in further detail above in relation to FIG. 9, may include operations to normalize the answered question so that, for example, superfluous words are removed, synonyms are substituted, or other alterations are made to the question so that substantially similar questions are recognized as such. At stage 1050, the tracking module 340 writes one or more answered questions to the tracking data storage area 370. The tracking data may be used in the computation of statistics information in determining, for example, the most frequently asked questions or the least frequently asked questions. The statistical data is used, for example, to determine which unanswered questions occur most frequently so that providing an answer is given the corresponding priority, or to determine which areas are causing users the most confusion or requests for assistance.

Alternatively, in the instance where decision stage 1020 determines the user action is to track an unanswered question, the tracking module 340 continues to invoke the NLI module at stage 334 similarly to the tracking of answered questions as described above. The NLI module 334 may include operations to normalize the unanswered question so that, for example, superfluous words are removed, synonyms are substituted, or other alterations are made to the question so that substantially similar questions are recognized as such. At stage 1040, the tracking module 340 writes one or more unanswered questions to the tracking data storage area 370, also described above.

In the alternative instance where decision stage 1020 determines the user action is to access a question/answer pair, the tracking module 340 continues to stage 1030 to write (log) the question/answer pair access to the tracking data storage area 370. The tracking module 340 continues to an end stage 1060. The end stage 1060 includes, for example, termination processing such as the transfer of return parameters to the calling module, the closing of files or devices, or other termination processing.

Figure 11:
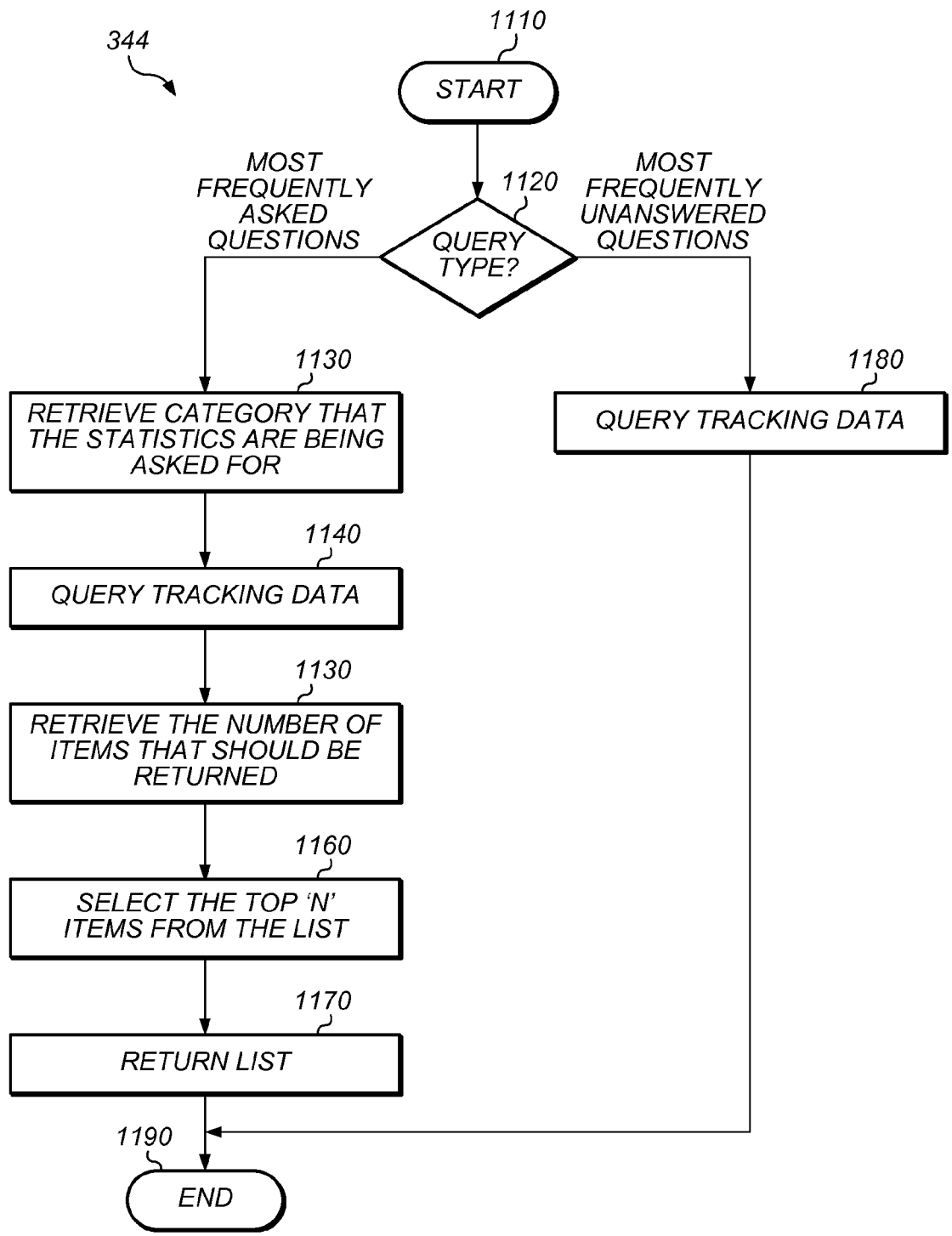
FIG. 11 is a flowchart of a process of retrieving questions that are organized using statistical information as performed by the statistics module shown in FIGS. 3, 6 and 7.

FIG. 11 is a flowchart of a process of retrieving questions that are organized using statistical information as performed by the statistics module 344 shown in FIGS. 3, 6 and 7. In this embodiment, the statistics module process 344 includes a start stage 1110, which includes, for example, initialization processing or other module startup processing. At decision stage 1120, the statistics module 344 determines the query type requested by the user or calling module. In the instance where the query type is to return the most frequently asked questions, the statistics module 344 proceeds to stage 1130. At this stage, the statistics module 344 retrieves the category for which the statistics are being requested, as statistics may be accumulated and tracked separately for assorted categories of user assistance requests. The category may, for example, be retrieved as a parameter from the calling module, stored in a memory location, or other manner of communication data. At stage 1140, the statistics module 344 performs a query of tracking data from the tracking data storage area 370 to obtain an ordered list of questions that were asked for a given category. At stage 1140, the statistics module 344 retrieves the number of items that are returned in response to the query in stage 1140. At stage 1160, the statistics module 344 allows the selection of the top 'N' items from the list, where 'N' represents the number of items that are returned as in stage 1150 above. The statistics module 344 returns the list of most frequently asked questions at stage 1170 as stored in the tracking data storage area 370. The statistics module 344 continues at an end stage 1190.

Alternatively, in the instance where the decision stage 1120 determines that the query type is to return the most frequently unanswered questions, the statistics module 344 proceeds to stage 1180. At this stage, the statistics module 344 queries the tracking data storage area 370 to obtain an ordered list of questions that are marked as unanswered. The statistics module 344 continues at an end stage 1190. The end stage 1190 includes, for example, termination processing such as the transfer of return parameters to the calling module, the closing of files or devices, or other termination processing.

Figure 12:
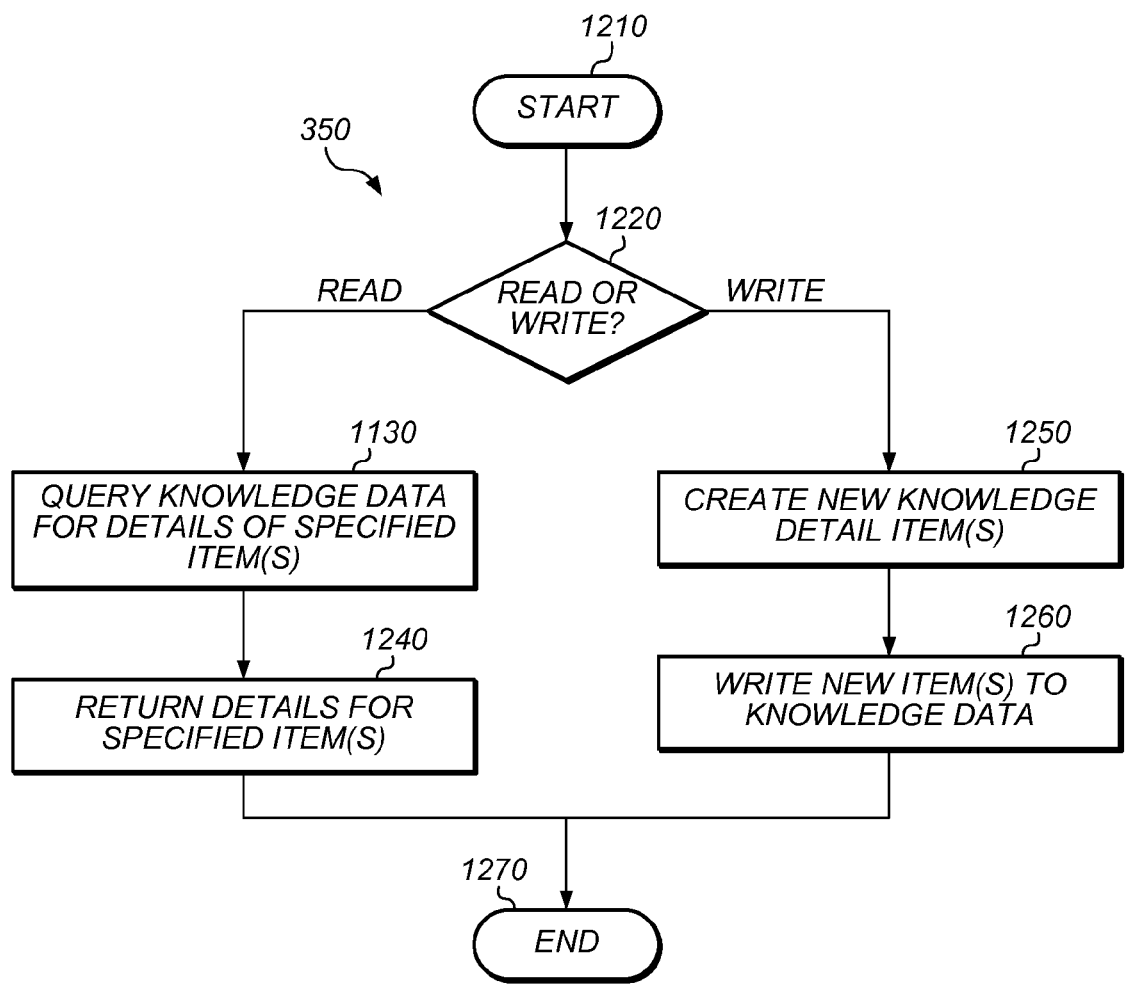
FIG. 12 is a flowchart of a process of retrieving or updating knowledge information as performed by the knowledge module shown in FIGS. 3, 5, 6 and 7.

FIG. 12 is a flowchart of a process of retrieving or updating knowledge information as performed by the knowledge module 350 shown in FIGS. 3, 5, 6 and 7. In this embodiment, the knowledge module process 350 includes a start stage 1210, which includes, for example, initialization processing or other module startup processing. At decision stage 1220, the knowledge module 350 determines whether the invocation is made to perform a read operation from the knowledge data storage area 374 as shown in FIG. 3, or a write operation to the knowledge data storage area 374. In the instance where the calling module specifies a read operation, the knowledge module 350 queries the knowledge data storage area 374 for details of specified items at stage 1230. The details obtained at stage 1230 may include, for example, an answer for a frequently asked question, a category for the question/answer pair, a confidence threshold for the question/answer pair, or other user assistance request information. The knowledge data storage area 374 may be one or more database or types of databases, for example SQL, one or more computer disk drive, computer memory, or other similar area or device in which data may be stored. At stage 1240, the knowledge module 350 returns the details obtained at stage 1230 for the specified items. The details may be returned in a plurality of ways, for example as returned module calling parameters, stored for access by other modules, or other manners of returning data from a module. The knowledge module 350 continues at an end stage 1270.

Alternatively, in the instance where the calling module specifies a write operation, the knowledge module 350 creates one or more new knowledge detail items. At stage 1260, the knowledge module 350 writes the new item created at stage 1250 to the knowledge data storage area 374. The knowledge module 350 continues at the end stage 1270. The end stage 1270 includes, for example, termination processing such as the transfer of return parameters to the calling module, the closing of files or devices, or other termination processing. In another embodiment, the authoring module 328 may suggest answers to unanswered questions, for example those below a certain confidence threshold, by invoking the NLI module 334

Figure 13:
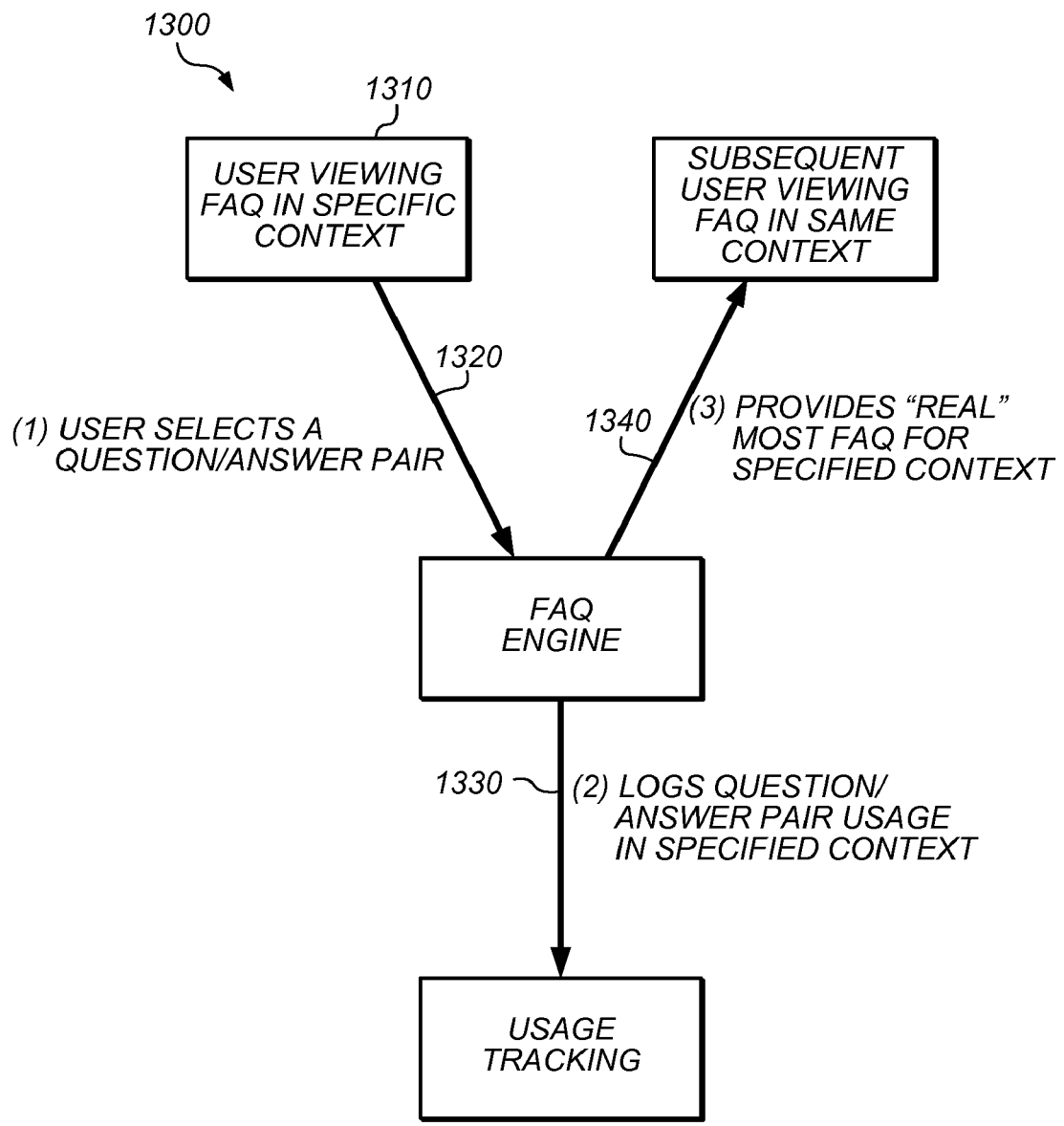
FIG. 13 is a diagram of a process of dynamically updating context sensitive frequently asked questions (FAQs) information as performed by the suggestion module shown in FIGS. 3, 4 and 6.

FIG. 13 is a diagram of a process 1300 of dynamically updating context sensitive frequently asked questions (FAQs) information as performed by the suggestion module 324 shown in FIGS. 3, 4 and 6. In this embodiment, the user assistance system 210 provides dynamically computed FAQ statistics information. The user 114 views an FAQ in a specific context 1310, and may select an FAQ question/answer pair 1320 from a question/answer pair list, for example arranged in order of the frequency asked by the statistics module 344 (see description above in relation to FIG. 11). The tracking module 340 logs the selection of the question/answer pair request and the statistics module 344 updates the frequency statistics for the selected question/answer pair in the specified context 1330. Subsequent users viewing the FAQ list in a similar context are shown a list with the updated statistical information relating to the frequency with which the question/answer pair was selected 1340. In this way, the FAQ list is dynamically arranged such that the statistics module 344 computes statistics information that is updated as the system 210 is being used. Thus, as users generally become more sophisticated and knowledgeable in the use of a website, intranet system, or other content system, the more advanced and sophisticated nature of the questions asked will be reflected in the statistics information for the question/answer pairs.

Figure 14:
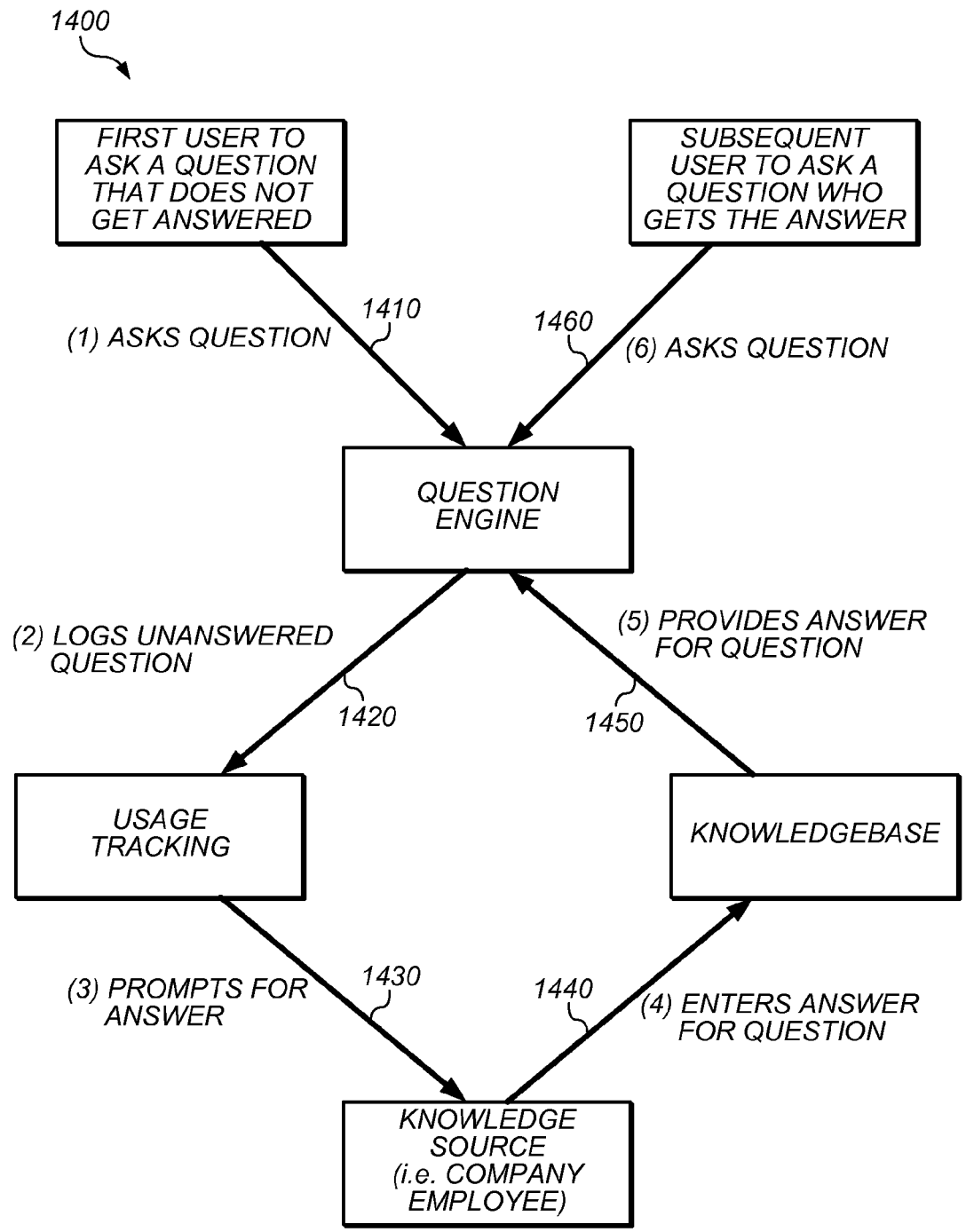
FIG. 14 is a diagram of a process of dynamically updating answers for unanswered questions as performed by the question module shown in FIGS. 3, 4 and 5.

FIG. 14 is a diagram of a process 1400 of dynamically updating answers for unanswered questions as performed by the question module 320 shown in FIGS. 3, 4 and 5. In further embodiments, the user assistance system 210 provides for subsequent users to benefit from answers being provided for previously unanswered questions. In this manner, the system 210 may be continually improved by the inclusion of additional answers to the knowledge data 374. As an example, the user 114 asks a question or makes other assistance inquiry 1410 for which an answer is not present in the knowledge base data 374. The tracking module 340 logs the unanswered inquiry 1420 in the tracking data area 370. The knowledge module 350 invokes the statistics module 344 to display the list of frequently asked unanswered inquiries and prompts the authorized user for an answer 1430. The authoring module 328 allows the user, for example a CSR, to enter answers to the unanswered questions 1440, which are stored in the knowledge data area 374. A subsequent user 114 making a similar or identical inquiry 1460 thereby is provided the answer to the question 1450 rather than receiving no answer, which is likely to be beneficial, for example, in increasing user satisfaction, increasing the time users spend on websites, or increasing the efficiency of users in performing various tasks.

One embodiment of the present user assistance system 210 includes techniques whereby a user request for assistance is provided by displaying assistance information via a website using a web browser, for example on a monitor 118 such as shown above in FIG. 1. The information may be conveyed to the user by displaying data from a stored file, by linking to another website or file, for example by utilizing a hypertext link, or other techniques for displaying information to a user via a web browser. In this embodiment, the web pages are typically implemented by using a markup language, for example HTML, SGML, XML, although other programming languages or other techniques for conveying information to the user are also within the scope of the invention.

A further embodiment includes techniques whereby user assistance requests are responded to by the transmission of electronic mail (e-mail) messages. E-mail usage has become widespread on Intranets and the Internets, and thus is a technique by which many computer users are accustomed to communicating with others. Since user assistance is likely better provided by techniques with which users are familiar and comfortable, this ubiquitous aspect of e-mail usage is beneficial in providing effective user assistance. In this embodiment, in the instance where the knowledge module 350 determines that the knowledge data storage area 374 contains an answer for the user assistance inquiry (see description above in relation to FIG. 12), one or more e-mail messages are transmitted to the user providing an answer or answers to the requested inquiry. In a further embodiment, the user assistance system 210 automatically generates and transmits one or more e-mail messages upon the authoring module 328 allowing a user to enter answers (see description above in relation to FIG. 7) to unanswered questions.

Similarly, in another embodiment, techniques are included whereby user assistance requests are responded to by the transmission of chat messages. Chat may be considered essentially real-time communication between two or more users via computing or communication devices. Once a chat communication is initiated, any user may enter text by typing on a keyboard or other user input device and the entered text appears on the other users' monitor of display area. The use of chat features is widespread and many networks and online services offer a chat feature. Thus electronic chat is a technique by which many computer users are accustomed to communicating with others, similarly providing effective user assistance as described above in relation to the e-mail embodiment.

In certain embodiments of the user assistance system 210, techniques are included whereby user assistance may be provided in an automated manner. For example, as described above, e-mail messages may be automatically generated and transmitted, help files or messages may be automatically displayed to a user, for example on a monitor 118 such as shown above in FIG. 1, prior to requesting assistance in anticipation of the need for assistance and the selection of appropriate assistance based on the present user context, or other automated user assistance may be provided. In other embodiments, user assistance is provided in a manual manner, for example a customer service representative (CSR) may enter answers and other assistance information without being prompted or reminded by the user assistance system 210. A mixed-mode manner of updating user assistance information, whereby portions of the assistance are provided in an automated manner and certain additional portions are provided in a manual manner, are additionally within the scope of the invention.

In certain embodiments, the user assistance system 210 allows user assistance categories to be user defined. In these embodiments, categories are a subset of the knowledge data 374, and may be defined or customized by the content owners or help providers according to their particular needs. In this manner, the system 210 may be readily adapted to fulfill a plurality of customer requirements. Additionally, questions, for example FAQs or question/answer pairs, may have a plurality of categories defined for them, thereby further enhancing the adaptability of the system 210 allowing for further customer customization.

As described herein, the invention fills the longstanding need in the technology of a system whereby a content provider can offer a modular user assistance system that can be attached to a website or other information source that can be searched and updated to create a dynamic help environment. This dynamic environment is able to become "smarter" over time and to track the questions and answers by a number of methods to assure the answers are up to date and that there is a high confidence match for the users' inquiry. Additionally, the system provides a method for incorporating new content and answers from users and support persons that are categorized and stored for later reference and use.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes that come within the meaning and range of equivalency of the claims are to be embraced within their scope.

What is claimed is:

1. A non-transitory computer accessible storage medium storing program logic operative for implementing:

receiving a question from a computer executed application, wherein the question pertains to use of a particular website or particular information source of a content provider;

in response to receiving the question, identifying an operational context in which the question is submitted, wherein the operational context is associated with the question, and wherein the operational context comprises one or more of:

a location, within the particular website or particular information source, from which the question is submitted; or information about a system from which the question is submitted;

in response to identifying the operational context for the question, determining a category for the question, wherein the category is determined dependent upon the identified operational context;

retrieving a result for the question, wherein the category and the question are both used to retrieve the result;

based on the result, determining whether the question is an answered question or an unanswered question; and when the question is determined as an answered question:

using a natural language indexing module to normalize the answered question, wherein one or more superfluous words are removed from the answered question to determine whether another question is substantially similar to the answered question; and storing the normalized answered question in association with tracking data for the normalized answered question, wherein the tracking data indicates that the question was answered; and when the question is determined as an unanswered question:

using a natural language indexing module to normalize the unanswered question, wherein one or more superfluous words are removed from the unanswered question to determine whether another question is substantially similar to the unanswered question; and storing the normalized unanswered question in association with tracking data for the normalized unanswered question, wherein the tracking data indicates that the normalized unanswered question was not answered.

2. The non-transitory computer accessible storage medium of claim 1, wherein identifying the operational context comprises determining whether a web page has been visited.

3. The non-transitory computer accessible storage medium of claim 1, wherein identifying the operational context comprises identifying a time that a web page is accessed.

4. The non-transitory computer accessible storage medium of claim 1, wherein identifying the operational context comprises determining a format associated with the question.

5. The non-transitory computer accessible storage medium of claim 4, wherein the format comprises input from a field in a web page.

6. The non-transitory computer accessible storage medium of claim 4, wherein the format comprises an e-mail message.

7. The non-transitory computer accessible storage medium of claim 4, wherein the format comprises an electronic chat question.

8. The non-transitory computer accessible storage medium of claim 1, wherein identifying the operational context comprises determining a hardware environment associated with the computer executed application.

9. The non-transitory computer accessible storage medium of claim 1, wherein the program logic is further operative for generating a web page configured to present an answer to the question based on said result.

10. The non-transitory computer accessible storage medium of claim 1, wherein the program logic is further operative for generating an e-mail configured to present an answer to the question based on said result.

11. The non-transitory computer accessible storage medium of claim 1, wherein said determining a category for the question comprises using the identified operational context to search one or more context-to-category maps.

12. A non-transitory computer accessible storage medium storing program logic operative for implementing:
receiving at least one question from a computer executed application into a question module, wherein the at least one question pertains to use of a particular website or particular information source of a content provider;
normalizing the at least one question, wherein the normalizing the at least one question comprises removing one or more superfluous words from the question;
identifying at least one category associated with a context in which the at least one question was submitted using a context module, wherein the context comprises one or more of:
a location, within the particular website or particular information source, from which the at least one question is submitted; or
information about a system from which the at least one question is submitted;
retrieving results for the at least one question, wherein the category and the at least one question are both used to retrieve the results;
based on the results, determining whether the at least one question comprises an answered question or an unanswered question;
when the at least one question is determined as comprising an answered question, using a knowledge module to compose a detailed answer to the at least one question;
when the at least one question is determined as comprising an unanswered question:
logging the unanswered question using a tracking module; and
identify a plurality of frequently asked unanswered questions; and
providing an authoring module configured to generate a request for an answer to each of the plurality of frequently asked unanswered questions, wherein the authoring module is further configured to receive input, wherein the input is used to answer one or more of the plurality of frequently asked unanswered questions.

13. A system, comprising:
a processor; and
a non-transitory computer accessible storage medium storing program logic operative for implementing:
a question module configured to receive at least one question from a computer executed application;
a context/category module configured to identify at least one category mapped to a context in which the at least one question is submitted, wherein the context comprises one or more of:
a location, within a particular website or particular information source, from which the question is submitted; or
information about a system from which the question is submitted;
wherein the question module is further configured to:
retrieve results for the at least one question, wherein the at least one category and the at least one question are both used to retrieve the results;
based on the results, determine whether the at least one question is an answered question or an unanswered question;
in response to determining that the at least one question is an answered question:
use a knowledge module to compose an answer to the at least one question, wherein the knowledge module is configured to identify the answer to the at least one question based on the at least one category;
return the answer in response to the question; and
use a tracking module to store the answered question in association with tracking data for the answered question, wherein the tracking data indicates that the answered question was answered; and
in response to determining that the at least one question is an unanswered question:
use the tracking module to store the unanswered question in association with tracking data for the unanswered question, wherein the tracking data indicates that the unanswered question was not answered;
a statistics module configured to identify one or more frequently asked unanswered questions;
an authoring module configured to display the one or more frequently asked unanswered questions and receive answer data for the one or more frequently asked unanswered questions;
wherein the statistics module is further configured to provide a question and answer pair based on a most frequently asked question associated with the at least one category;
a suggestion module configured to provide the question and answer pair in response to a request for assistance;
wherein for each one of a plurality of requests, based on a request type of the one of the plurality of requests, the program logic is configured to select one of the question module, the suggestion module, or the authoring module to handle the one of the plurality of requests; and
wherein the context/category module, the knowledge module, the statistics module, and the tracking module are each used by one or more of the question module, the suggestion module, or the authoring module in handling the plurality of requests.

14. The system of claim 13, wherein the authoring module automatically associates the answer data with the one or more frequently asked unanswered questions.

* * * * *

UNITED STATES PATENT AND TRADEMARK OFFICE
CERTIFICATE OF CORRECTION

PATENT NO. : 7,831,688 B2  Page 1 of 1
APPLICATION NO. : 09/876788
DATED : November 9, 2010
INVENTOR(S) : Ronald A. Linyard et al.

It is certified that error appears in the above-identified patent and that said Letters Patent is hereby corrected as shown below:

On the Face of the Patent:

Under "Related U.S. Application Data":

before "provisional application No. 60/209,946," please add --CON of 09/805,417, filed Mar. 13,2001, now abandoned,-- after "60/209,841, filed on," please delete "Jun. 7, 2000" and insert --Jun. 6, 2000-- in place thereof.

Signed and Sealed this
Twenty-sixth Day of April, 2011

David J. Kappos
*Director of the United States Patent and Trademark Office*